US008805148B2

(12) United States Patent
Avouris et al.

(10) Patent No.: US 8,805,148 B2
(45) Date of Patent: Aug. 12, 2014

(54) GENERATION OF TERAHERTZ ELECTROMAGNETIC WAVES IN GRAPHENE BY COHERENT PHOTON-MIXING

(75) Inventors: Phaedon Avouris, Yorktown Heights, NY (US); Chun-Yung Sung, Poughkeepsie, NY (US); Alberto Valdes Garcia, Hartsdale, NY (US); Fengnian Xia, Plainsboro, NJ (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 13/182,621

(22) Filed: Jul. 14, 2011

(65) Prior Publication Data

US 2013/0015375 A1    Jan. 17, 2013

(51) Int. Cl.
    *G02B 6/10*    (2006.01)
(52) U.S. Cl.
    USPC ............................. 385/131; 385/122; 385/141
(58) Field of Classification Search
    None
    See application file for complete search history.

(56) References Cited

U.S. PATENT DOCUMENTS

| 6,144,679 | A | 11/2000 | Herman et al. |
| 6,348,683 | B1 | 2/2002 | Verghese et al. |
| 7,515,801 | B2 * | 4/2009 | McCaughan et al. ......... 385/122 |
| 2010/0021708 | A1 | 1/2010 | Kong et al. |
| 2010/0200755 | A1 | 8/2010 | Kawano et al. |

OTHER PUBLICATIONS

Ryzhii et al., "Terahertz lasers based on optically pumped multiple graphene structures with slot-line and dielectric waveguides", Journal of Applied Physics 107, 054505, Mar. 8, 2010.*
Khoury et al., "Electrically Tunable Surface Plasmon Source for THz Applications", IEEE Journal of Selected Topics in Quantum Electronics, vol. 17, No. 1, Jan./Feb. 2011.*
Ryzhii et al., "Concepts of Terahertz and Infrared Devices Based on Graphene Structures", 36th International Conference on Infrared, Millimeter and Terahertz Waves (IRMMW-THz), Oct. 2011.*
Ryzhii et al., "Feasibility of terahertz lasing in optically pumped epitaxial multiple graphene layer structures", American Institute of Physics 106, 084507, Oct. 22, 2009.*
Bjarnason, J., et al., "ErAs:GaAs photomixer with two-decade tenability and 12 μW peak output power" Applied Physics Letters, vol. 85, No. 18. Nov. 2004. pp. 3983-3985.
Brown, E., et al., "Coherent millimeter-wave generation by heterodyne conversion in low-temperature-grown GaAs photoconductors" Journal of Applied Physics, vol. 73. Feb. 1993. pp. 1480-1484.
Nugent, D., "IBM in graphene breakthrough" Cleo Conference, May 2010. (2 Pages) http://blog.cleoconference.org/2010/05/ibm-in-graphene-breakthrough/.
Saeedkia, D., et al., "Terahertz photonics: optoelectronic techniques for generation and detection of terahertz waves" Journal of Lightwave Technology, vol. 26, No. 15. Aug. 2008. pp. 2409-2423.
Tonouchi, M., "Cutting-edge terahertz technology" Nature Photonics, vol. 1. Feb. 2007. pp. 97-105.

(Continued)

*Primary Examiner* — Michelle R Connelly
(74) *Attorney, Agent, or Firm* — Tutunjian & Bitetto, P.C.; Vazken Alexanian

(57) ABSTRACT

An electromagnetic device and method for fabrication includes a substrate and a layer of graphene formed on the substrate. A metallization layer is patterned on the graphene. The metallization layer forms electrodes such that when the graphene is excited by light, terahertz frequency radiation is generated.

22 Claims, 7 Drawing Sheets

(56) References Cited

OTHER PUBLICATIONS

Verghese, S., et al., "Highly tunable fiber-coupled photomixers with coherent terahertz output power" IEEE Transactions on Microwave Theory and Techniques, vol. 45, No. 8. Aug. 1997. pp. 1301-1309.

Xia, F., et al., "Ultrafast Graphene Photodetector" Lasers and Electro-Optics (CLEO) and Quantum Electronics and Laser Science Conference (QELS), May 2010. (2 pages).

* cited by examiner

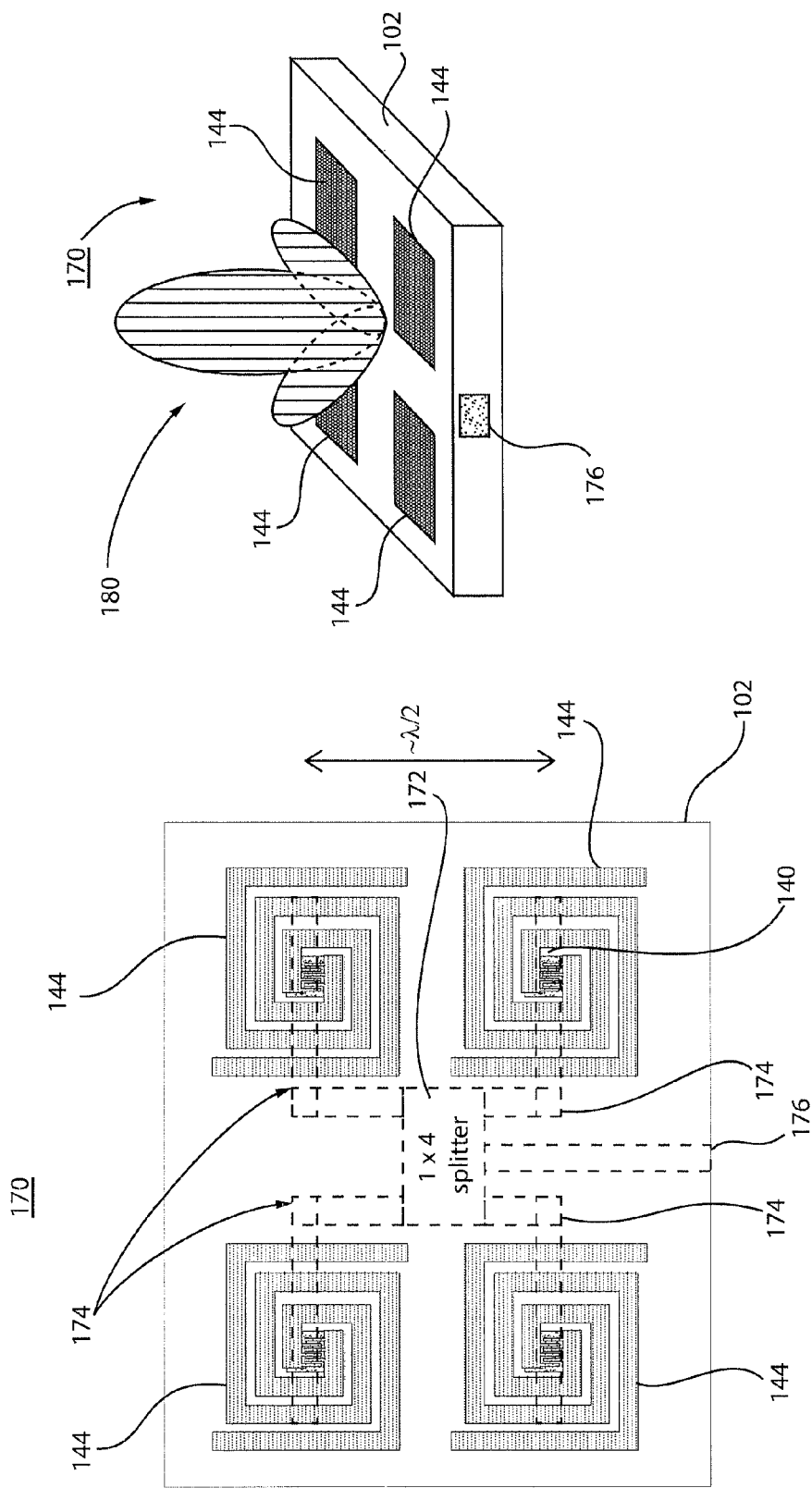

GENERATION OF TERAHERTZ ELECTROMAGNETIC WAVES IN GRAPHENE BY COHERENT PHOTON-MIXING

BACKGROUND

1. Technical Field

The present invention relates to electromagnetic wave propagation, and more particularly to devices and methods for generating terahertz electromagnetic waves using graphene.

2. Description of the Related Art

Terahertz emission refers to electromagnetic waves with frequencies ranging roughly from 0.1 to 10 THz, which is between the conventional microwave and optical frequencies. Generation of terahertz electromagnetic waves is of great scientific and technological importance. Terahertz electromagnetic (EM) waves have numerous applications in medical imaging, security, communications, manufacturing, and scientific spectroscopy. Coherent photon-mixing is one of the most promising ways to generate Terahertz EM waves. Compared with other approaches such as quantum cascade lasers and synchrotron light sources, its advantages include compact device size, room temperature operation, and continuous tunability.

To efficiently generate terahertz emission in a wide frequency range, the following three important requirements should be met. First, the carrier lifetime should be short (ideally in sub-ps range) to generate emission with a frequency larger than a few THz. Second, the carrier mobility should be as high as possible to maximize the photoconductivity of the material. Third, the heat generation should be minimized to achieve high terahertz output power.

Currently, the most commonly used material in coherent photon-mixing is low-temperature grown Gallium Arsenide (LT-GaAs). The major motivations for using this material are its short photo-carrier lifetime and relatively good carrier mobility (e.g., 100 to 200 $cm^2/Vs$).

There are two intrinsic limitations in these conventional photonic materials. These include: 1) short photo-carrier lifetime and high mobility cannot be realized simultaneously in conventional photonic semiconductors; and 2) heat generation is significant since the energy of photons used for THz generation has to exceed the band gap of the semiconductors. Conventional high-quality III-V materials usually have high carrier mobility (especially high electron mobility). At the same time, the photo-carrier lifetime is long (in the nanosecond range). To reduce the photo-carrier lifetime for high frequency THz generation, the quality of material is usually intentionally degraded by introduction of defects or dopants. These inevitably lead to reduction in carrier mobility and hence a decrease in photo-conductivity. A compromise is achieved in LT-GaAs, in which, the carrier lifetime is ~1 ps and the carrier mobility is around 100 $cm^2/Vs$. A large portion of the energy of the incident photons in THz generation using photon-mixing is dissipated by heat.

SUMMARY

An electromagnetic device and method for fabrication includes a substrate and a layer of graphene formed on the substrate. A metallization layer is patterned on the graphene. The metallization layer forms electrodes/antennas such that when the graphene is excited terahertz frequency radiation is emitted.

Another electromagnetic device in accordance with the present principles includes a substrate and a waveguide formed on or in the substrate. A layer of graphene is formed over the waveguide. A metallization layer is patterned on the graphene wherein the metallization layer forms electrodes corresponding to an intersection region between the graphene and the waveguide such that when the graphene is excited terahertz frequency radiation is generated.

A method for fabricating an electromagnetic device includes providing a substrate; providing a layer of graphene on the substrate; and patterning a metallization layer on the graphene to form electrodes such that when the graphene is excited terahertz frequency radiation is generated.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 9 is a top view of a terahertz emitter device array with a waveguide integrated therein in accordance with another illustrative embodiment;

FIG. 10 is a perspective view of the terahertz emitter device array of FIG. 9 with a waveguide integrated therein showing a combined emission from the array in accordance with the present principles.

DETAILED DESCRIPTION OF PREFERRED EMBODIMENTS

Figure 1:
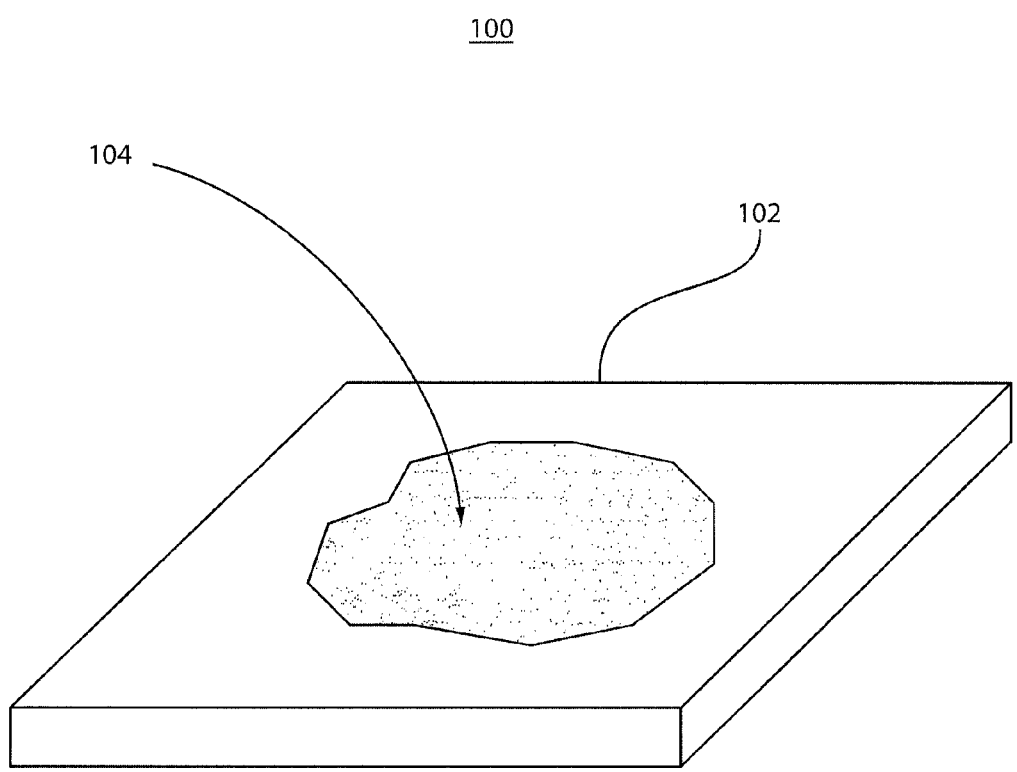
FIG. 1 is a perspective view of a substrate having a graphene layer formed thereon in accordance with the present principles.

The present principles provide terahertz (THz) electromagnetic emission generators, and methods for fabrication. In particularly useful embodiments, a single or multiple layer graphene (e.g., less than about 10 layers) is provided for THz generation using photon-mixing techniques. The properties (e.g., electronic and photonic) of graphene are particularly of interest for the present purposes. Graphene includes a photo-carrier lifetime that is short (sub-ps to tens of ps) and can be modified. Lifetime as short as <0.1 ps may be provided. Carrier mobility in graphene can be 10 to 100 times larger than low temperature gallium arsenide (LT-GaAs), leading to much higher photo-conductivity. Also, photons with small energy can be used for THz generation, leading to greatly reduced heat generation, and high power THz generation is possible using graphene. Therefore, the intrinsic problems for THz generation in conventional semiconductors can be overcome using graphene due to its unique electronic and photonic properties.

Coherent photo-mixing is provided in accordance with present embodiments. In this approach, two light beams with different frequencies ($f_1$ and $f_1$) but having a fixed phase difference are used to excite the graphene simultaneously. The graphene detects the transient photocurrent whose frequency is determined by a beating frequency (or the frequency difference $f_1$-$f_2$) of these two light beams. This transient photocurrent, which is coupled to an antenna, generates an electromagnetic wave containing THz components.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for an integrated circuit chip or components of such design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, a terahertz emission device 100 will now be described in terms of non-limiting illustrative configurations. A substrate 102 is provided for the device 100. Substrate 102 may include an insulator material, such as, e.g., an oxide like a silicon oxide, or a semiconductor material, such as e.g., SiC or the like. The substrate 102 may be formed or dimensioned for a single chip manufacture or may be a wafer with a plurality of devices that will need to be diced into chips at a future time.

Substrate 102 may include other devices, components and/or layers formed thereon as needed depending on the ultimate application and usage of the device 100. For example, a waveguide and supporting structures may be formed in the substrate 102 prior to subsequent processing to complete the fabrication of device 100. Substrate 102 is suited for the formation of a graphene material 104 therein or thereon. Graphene material 104 may include a chemical vapor deposited (CVD) layer, an epitaxially grown layer, a solution based deposited layer (dipping), a mechanically exfoliated layer (transferred layer), etc. The process by which graphene is deposited on the substrate 102 may vary with the material of the substrate, expense and/or other factors. For example, a mechanically exfoliated or CVD grown graphene can be deposited on an oxide substrate 102. Alternatively, epitaxially grown graphene may be provided on a silicon carbide substrate 102.

The graphene material 104 may be roughly formed in terms of coverage on the substrate 102 since the graphene may be shaped in later steps. The graphene material 104 may be formed with between about 1 to about 10 graphene layers, although additional layers may also be useful.

Figure 3:
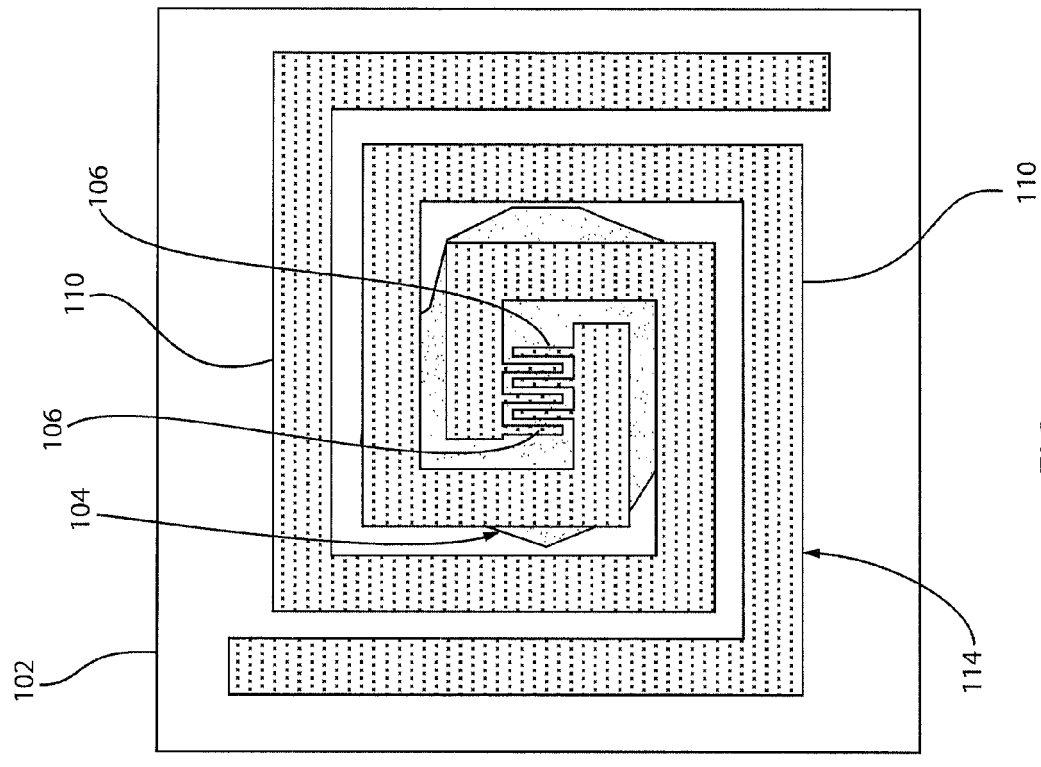
FIG. 3 is a top view of the substrate with the graphene layer having an antenna metallization structure formed thereon in accordance with the present principles.
Figure 2:
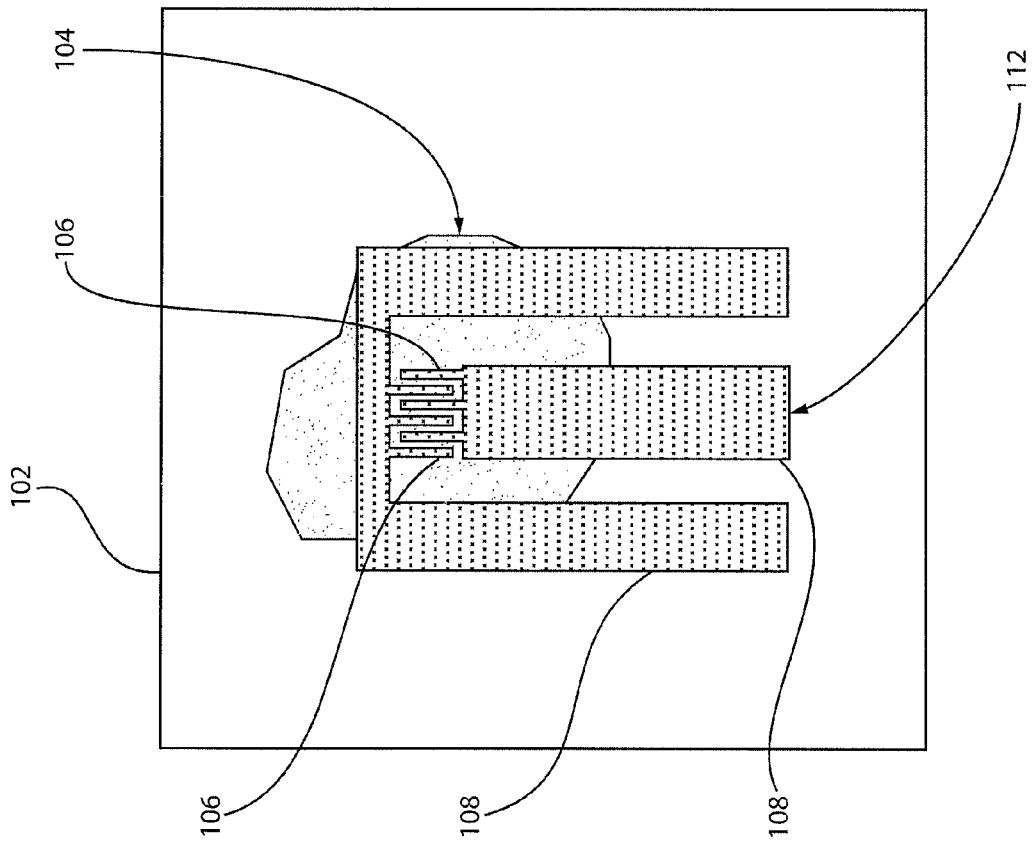
FIG. 2 is a top view of the substrate with the graphene layer having a coplanar waveguide metallization structure formed thereon in accordance with the present principles.

Referring to FIGS. 2 and 3, in one embodiment, metallization structures are formed. The structures may include interdigitated metal fingers 106 and support structures 108 and 110 that are fabricated by, e.g., lithographic techniques, lift-off techniques, etc. For coupling of THz emissions, a plurality of types of schemes may be employed. These may include a coplanar waveguide structure 112 (e.g. to handle frequencies of up to 0.2 THz) as shown in FIG. 2 or a spiral antenna structure 114 (e.g., to handle high frequencies up to 10 THz) in FIG. 3. The metal fingers 106 and support structures 108 and 110 may be formed from copper, aluminum, tungsten, or similar metals. The sizes and shapes of the fingers 106 and support structures 108 and 110 can vary with application and performance requirements. The present principles are not limited to the structures described and shown. Other structures and applications are also contemplated.

Figure 4:
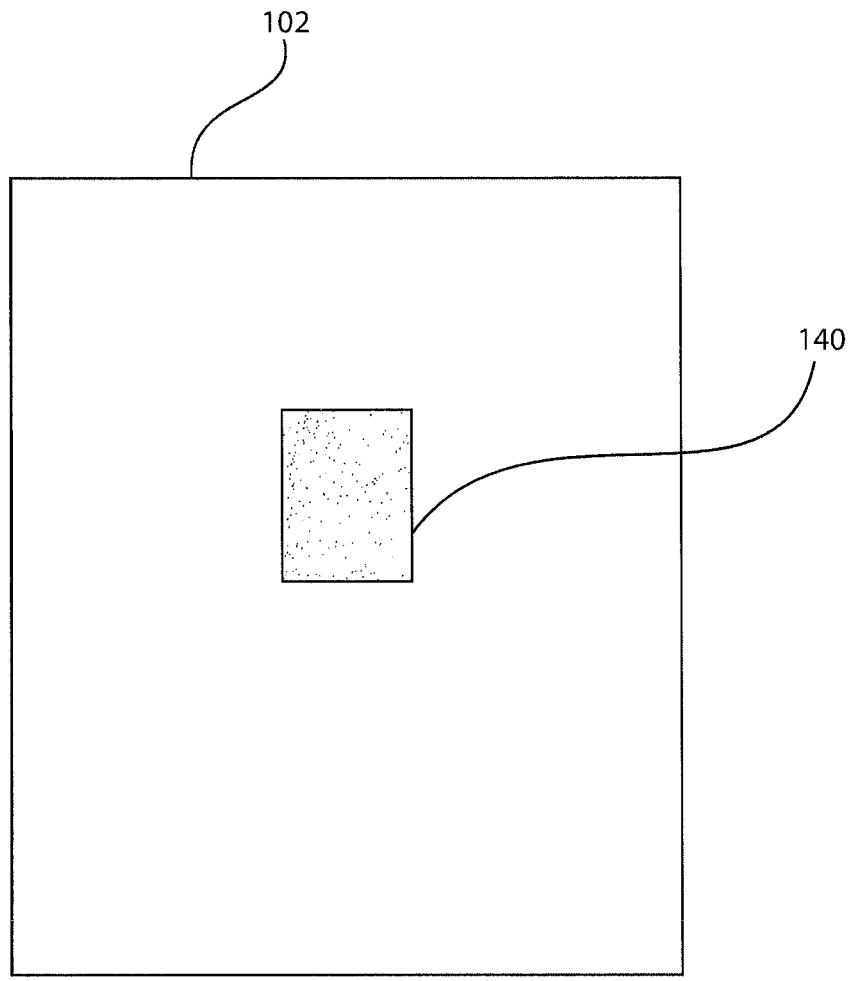
FIG. 4 is a top view of a substrate with a patterned graphene layer formed into a shape by selective removal of graphene in accordance with the present principles.

Referring to FIG. 4, instead of employing the graphene material 104 in its as deposited form, the graphene material 104 may be patterned to adjust its shape. A lithographic mask may be formed on the substrate 102 and the graphene material 104, patterned, for example, by a lithographic development process and etched to form a shaped graphene material 140. The mask (not shown) is then removed to expose the shaped graphene material 140. The graphene material 140 is illustratively depicted in a rectangular shape, but other shapes may also be employed, e.g., circular, oval, polygon, etc. The graphene material 140 in undesirable areas are preferably removed by, e.g., an oxygen plasma based dry etch. Other etching or patterning processes may also be employed.

Figure 6:
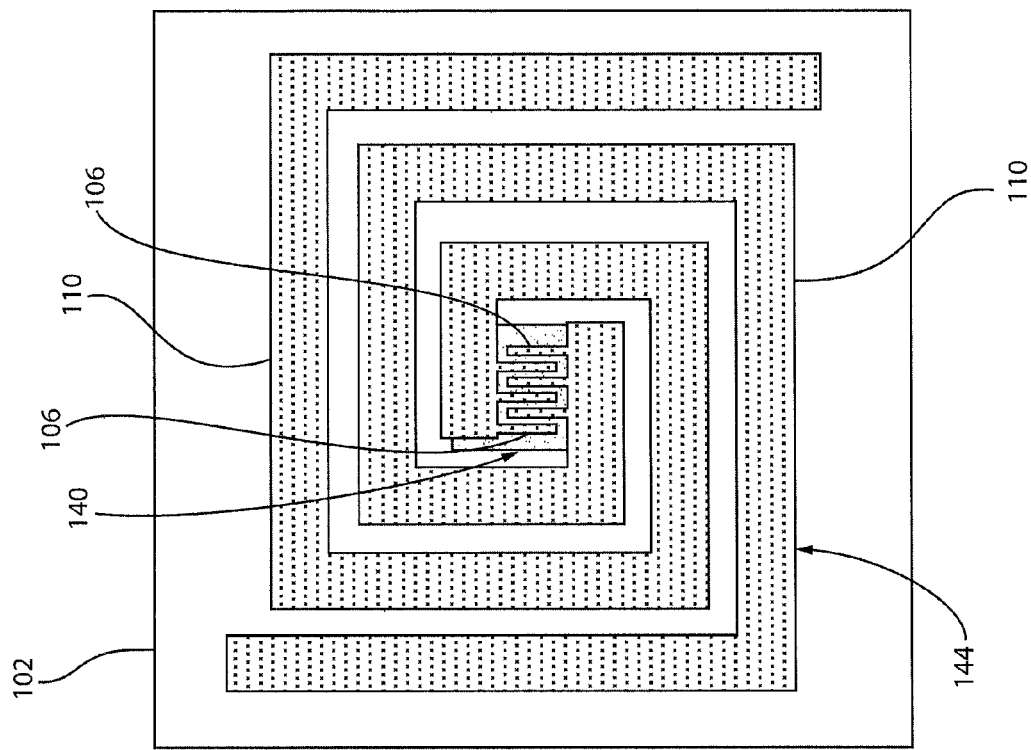
FIG. 6 is a top view of the substrate with the shaped graphene layer of FIG. 4 having an antenna metallization structure formed thereon in accordance with the present principles.
Figure 5:
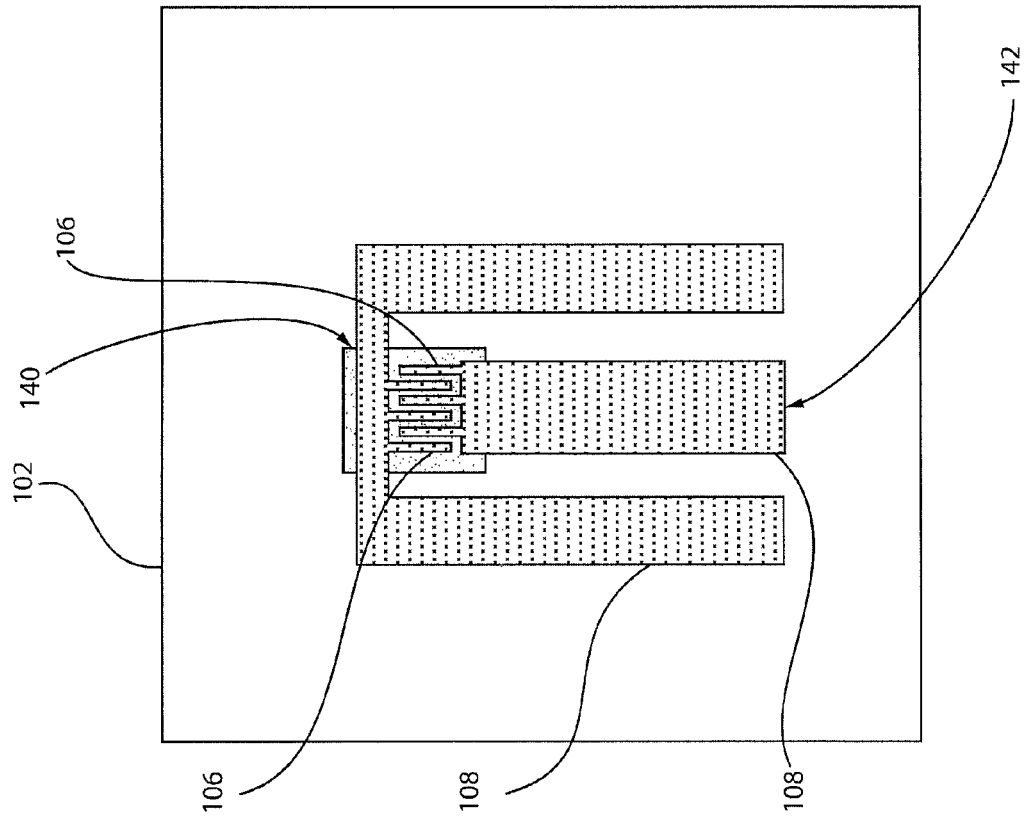
FIG. 5 is a top view of the substrate with the shaped graphene layer of FIG. 4 having a coplanar waveguide metallization structure formed thereon in accordance with the present principles.

Referring to FIGS. 5 and 6, in other embodiments, metallization structures are formed on or over the shaped graphene material 140. The structures may include interdigitated metal fingers 106 and support structures 108 and 110 that are fabricated by, e.g., lithographic techniques, lift-off techniques, etc. For coupling of THz emissions, a plurality of types of schemes may be employed. These may include a coplanar waveguide structure 142 (e.g., to handle frequencies of up to 0.2 THz) as shown in FIG. 5 or a spiral antenna structure 144 (e.g., to handle high frequencies up to 10 THz) in FIG. 6. As before, the metal fingers 106 and support structures 108 and 110 may be formed from copper, aluminum, tungsten, or similar metals. The sizes and shapes of the fingers 106 and support structures 108 and 110 can vary with application and performance requirements. The present principles are not limited to the structures described and shown. Other structures and applications are also contemplated.

Figure 7:
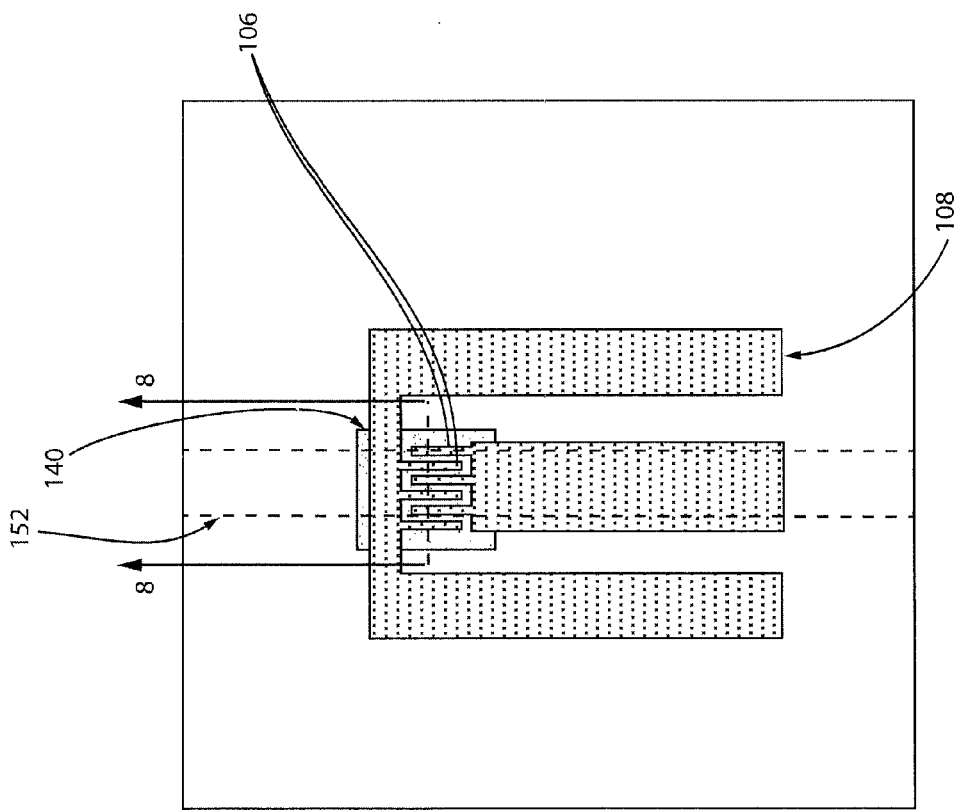
FIG. 7 is a top view of a terahertz emitter device with a waveguide integrated therein in accordance with one illustrative embodiment.

Referring to FIG. 7, to enhance photon-graphene coupling, other structures may be implemented. One such structure is illustratively depicted in FIG. 7 where photon-graphene coupling is enhanced by including a photonic waveguide 152 in or on the substrate 102. In this configuration, the shaped graphene 140 interacts with photons in the waveguide 152.

Figure 8:
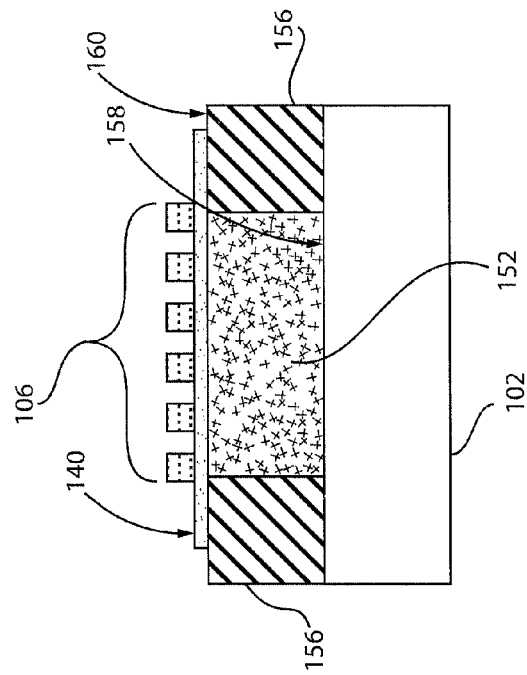
FIG. 8 is a cross-sectional view taken at section line 8-8 of FIG. 7 showing an illustrative configuration for the waveguide in accordance with one illustrative embodiment.

Referring to FIG. 8, a cross-sectional view taken at section line 8-8 of FIG. 7 shows details of one illustrative configuration of the waveguide 152. In this configuration, the substrate 102 includes an insulator layer 156 formed thereon. The insulator layer 156 may include an oxide, such as a silicon oxide, or other dielectric layer suitable for forming graphene thereon. The insulator layer 156 may be patterned to form a trench 158 into which the waveguide 152 is placed or is formed. A top surface 160 may be planarized or etched to prepare the surface for the formation of the graphene material 104 (or 140). The waveguide 152 may include a glass, a polymeric material, a semiconductor material, etc. In other embodiments, the waveguide 152 may be integrated into the substrate 102 or a portion of the substrate is removed (e.g., a trench is formed) to form or place the waveguide 152 therein.

Referring to FIG. 9, in other embodiments, multiple copies of the described THz radiation unit can be fabricated on the same substrate to form a THz generator array. For example, an array 170 of THz generators is provided. In this example, the array 170 includes four spiral antennas 144 having graphene material 140 disposed below fingers 106 as described above. In this case, the light beams are first coupled into a waveguide input 176, and subsequently split by a splitter (1×4) 172 into multiple waveguides 174. Multiple graphene based terahertz generators (antennas 144) are excited. The input waveguide 176 is embedded or mounted on the substrate 102. The splitter 172 splits the light between four waveguides 174, one toward each antenna 144.

The optical distribution network is designed such that the path to each graphene-based generator has the same length. In this way, the radiation produced by each generator will have the same phase and hence it will combine coherently in space in a direction normal to the array. This design enables the generation of a larger amount of radiated power. The separation between individual radiators should be approximately ½ of the desired radiated wavelength (λ) for optimum spatial power combining efficiency. Note that a four element array is shown as an example but this principle can be extended to N elements as long as the optical distribution network maintains an equal path length to each radiating element.

Referring to FIG. 10, a perspective view of the array 170 shows a combined radiation output 180. The configuration provided by the array 170 may be employed in shaping the output distribution and power from the array 170.

Figure 11:
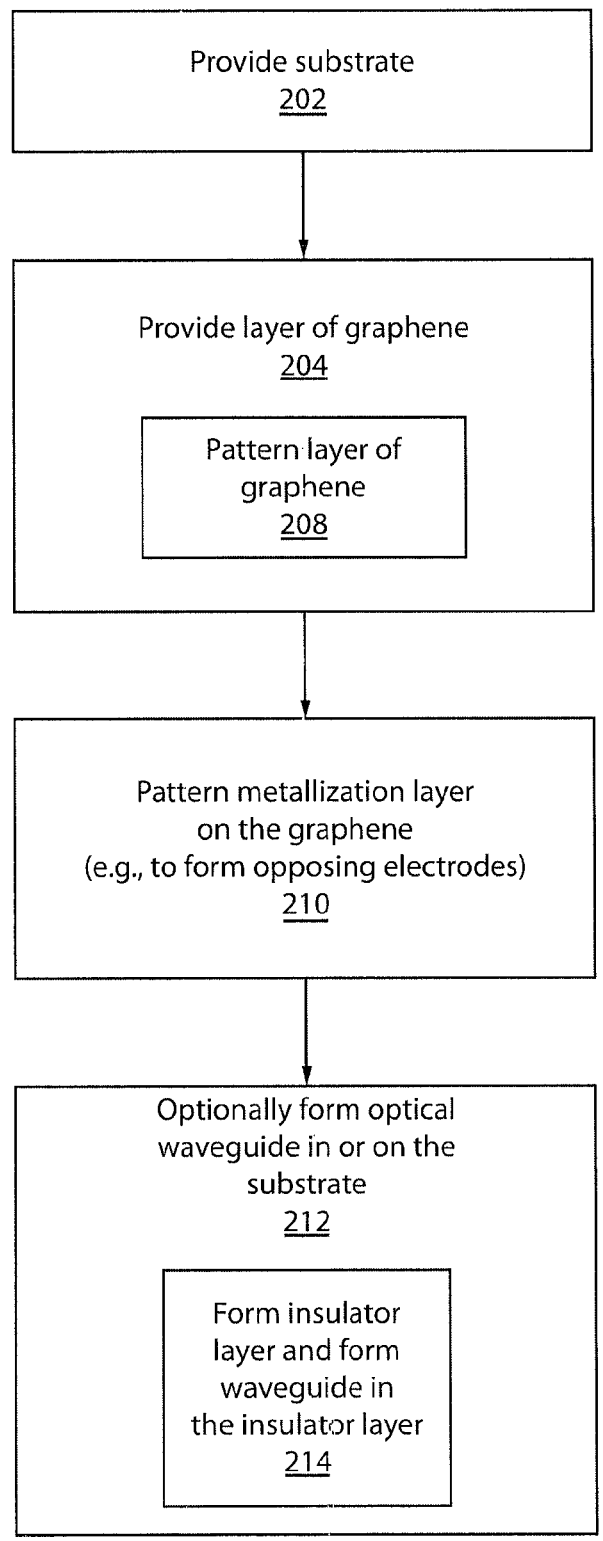
FIG. 11 is a block/flow diagram showing an illustrative method for fabricating an electromagnetic device with terahertz capabilities in accordance with one illustrative embodiment.

Referring to FIG. 11, a flow diagram shows a method for forming an electromagnetic device (e.g., a THz generator/receiver) in accordance with one illustrative embodiment. It should be noted that, in some alternative implementations, the functions noted in the blocks may occur out of the order noted in FIG. 11. For example, two blocks shown in succession may, in fact, be executed substantially concurrently, or the blocks may sometimes be executed in the reverse order, depending upon the functionality involved.

In block 202, a substrate is provided. The substrate may include any suitable materials. In useful embodiments, SiC and insulator substrates may be employed. In block 204, a layer of graphene is formed on the substrate or transferred to the substrate. The layer of graphene may be formed using CVD, epitaxial growth, dipping the substrate in a solution, mechanical exfoliation or other techniques for forming a graphene layer. In block 208, the layer of graphene may be patterned to form a shape. This may include patterning the graphene layer using lithographic or other techniques, e.g., selective etching, etc.

In block 210, a metallization layer is patterned on the graphene to form electrodes or antennas such that when the graphene is excited terahertz frequency radiation is emitted or detected. The patterned metallization may take many forms depending on the device being made. For example, a coplanar waveguide scheme, an antenna scheme, an array, etc. may be formed in the metallization layer.

In block 212, an optical waveguide may be formed in or on the substrate at a position where the graphene is excited. The metallization may provide electrode fingers over a particular region. The graphene is excited in the areas between the opposing electrodes. The waveguide is formed or provided at the intersection region of the opposing electrodes of the graphene layer. The waveguide may include splitters to equidistantly distributed THz generators in an array of generators. In block 214, in one embodiment, an insulator layer may be formed on the substrate and the optical waveguide may be formed over the substrate within the insulator layer.

The embodiments described herein may be employed as emitters and/or detectors of THz radiation that may be employed in a variety of applications (e.g., testing, damage evaluation, inspecting, etc.). Other applications may include use in lasers, photoconductive switches, photonic mixers, photodetectors, etc. Terahertz (THz) waves, or submillimeter/far-infrared waves, occupy the spectral domain which hosts low-frequency crystalline lattice vibrations (phonon modes), hydrogen bonding stretches, and other intermolecular vibrations of molecules in many chemical and biological materials, including pharmaceuticals and other biomolecules. The transmitted and reflected THz spectra of these materials contain THz absorption fingerprints characterizing these vibrational modes, providing information not readily available in other parts of the electromagnetic spectrum.

THz waves have low photon energies (1 THz=4.1 meV), one million times weaker than x-rays, and will not cause harmful photoionization in biological tissues. This has advantages both for imaging biological materials and in operational contexts where an operator or other subjects may be exposed to THz radiation. A substantial portion of room temperature blackbody radiation can be found in the terahertz band.

THz radiation can penetrate through many commonly used nonpolar dielectric materials such as paper, cardboard, textiles, plastics, wood, leather and ceramic with moderate attenuation. This permits THz waves to be used in non-invasive and non-destructive inspection using spectroscopy and imaging techniques.

In particularly useful embodiments, coherent photo-mixing is employed to generate THz emissions. In a preferred implementation, two light beams with different frequencies ($f_1$ and $f_1$) and a fixed phase difference are used to excite the graphene simultaneously. The graphene detects the transient photocurrent whose frequency is determined by the beating frequency (or the frequency difference $f_1$-$f_2$) of these two coherent light beams. This transient photocurrent, which is coupled to an antenna or other structure, generates an electromagnetic wave containing THz components.

Having described preferred embodiments for generation of terahertz electromagnetic waves in graphene by coherent photon-mixing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. An electromagnetic device, comprising:
   a substrate;
   a layer of graphene formed on the substrate; and
   a metallization layer patterned on the graphene, the metallization layer forming electrodes directly on the graphene such that when the graphene is excited across the electrodes terahertz frequency radiation is generated.

2. The device as recited in claim 1, wherein the metallization layer forms a coplanar waveguide over the graphene.

3. The device as recited in claim 1, wherein the metallization layer forms an antenna over the graphene.

4. The device as recited in claim 1, wherein the layer of graphene is patterned to form a shape.

5. The device as recited in claim 1, further comprising an optical waveguide integrated with graphene.

6. The device as recited in claim 5, wherein the optical waveguide is integrated into the substrate.

7. The device as recited in claim 5, wherein the optical waveguide is formed below a position where the graphene is excited.

8. The device as recited in claim 1, wherein the electrodes are formed as fingers over a position of the graphene.

9. The device as recited in claim 8, wherein the optical waveguide is formed below the position.

10. The device as recited in claim 1, further comprising an insulator layer formed on the substrate and an optical waveguide formed over the substrate within the insulator layer.

11. An electromagnetic device, comprising:
    a substrate;
    a waveguide formed on or in the substrate;
    a layer of graphene formed over the waveguide; and
    a metallization layer patterned on the graphene wherein the metallization layer forms electrodes directly on the graphene corresponding to an intersection region between the graphene and the waveguide such that when the graphene is excited across the electrodes terahertz frequency radiation is generated.

12. The device as recited in claim 11, wherein the metallization layer forms a coplanar waveguide over the graphene.

13. The device as recited in claim 11, wherein the metallization layer forms an antenna over the graphene.

14. The device as recited in claim 11, wherein the layer of graphene is patterned to form a shape.

15. The device as recited in claim 11, wherein the optical waveguide is integrated into the substrate.

16. The device as recited in claim 11, further comprising an insulator layer formed on the substrate and the optical waveguide being formed within the insulator layer.

17. The device as recited in claim 11, wherein the electrodes are formed as fingers over a position of the graphene.

18. A method for fabricating an electromagnetic device, comprising:
    providing a layer of graphene on a substrate; and
    patterning a metallization layer on the graphene to form electrodes directly on the graphene such that when the graphene is excited across the electrodes terahertz frequency radiation is generated.

19. The method as recited in claim 18, further comprising forming an optical waveguide in or on the substrate at a position where the graphene is excited.

20. The device as recited in claim 19, further comprising forming an insulator layer on the substrate, the optical waveguide being formed over the substrate within the insulator layer.

21. The method as recited in claim 18, wherein forming a layer of graphene includes patterning the layer of graphene to form a shape.

22. The device as recited in claim 18, wherein patterning the metallization layer includes forming the electrodes as fingers over a position of the graphene.

* * * * *